United States Patent
Wang et al.

(10) Patent No.: US 8,559,552 B2
(45) Date of Patent: Oct. 15, 2013

(54) DUAL CARRIER MODULATION PRECODING

(75) Inventors: Dong Wang, Ossining, NY (US);
Dagnachew Birru, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 201 days.

(21) Appl. No.: 12/937,015

(22) PCT Filed: Apr. 14, 2009

(86) PCT No.: PCT/IB2009/051559
§ 371 (c)(1),
(2), (4) Date: Oct. 8, 2010

(87) PCT Pub. No.: WO2009/128030
PCT Pub. Date: Oct. 22, 2009

(65) Prior Publication Data
US 2011/0033004 A1 Feb. 10, 2011

Related U.S. Application Data

(60) Provisional application No. 61/046,121, filed on Apr. 18, 2008, provisional application No. 61/161,897, filed on Mar. 20, 2009.

(51) Int. Cl.
*H04L 27/00* (2006.01)

(52) U.S. Cl.
USPC ........... 375/299; 375/264; 375/284; 375/285; 375/296; 375/298

(58) Field of Classification Search
USPC ......... 375/130–133, 135, 138–139, 239, 256, 375/259–261, 267–269, 295, 299–300
See application file for complete search history.

(56) References Cited

U.S. PATENT DOCUMENTS

| | | | |
|---|---|---|---|
| 5,349,682 A * | 9/1994 | Rosenberry | 718/102 |
| 6,870,883 B2 * | 3/2005 | Iwata | 375/240.01 |
| 7,512,185 B2 * | 3/2009 | Sharon et al. | 375/260 |
| 2005/0195765 A1 | 9/2005 | Sharon | |
| 2008/0260004 A1 * | 10/2008 | Batra et al. | 375/146 |
| 2008/0301536 A1 * | 12/2008 | Shin et al. | 714/786 |
| 2008/0310526 A1 * | 12/2008 | Maltsev et al. | 375/260 |
| 2009/0086849 A1 * | 4/2009 | Tsai et al. | 375/298 |

OTHER PUBLICATIONS

Ki-Hong Park et al: "BER Analysis of Dual Carrier Modulation Based on ML Decoding" Asia-Pacific Conference on Communications, 2006, Aug. 1, 2006, pp. 1-4, XP031024236.

Oun Yang et al: "A Cooperative Modulation Scheme for Wireless Relay Networks" IEEE 65th Vehicular Technology Conference—VTC2007, Apr. 1, 2007, pp. 1628-1632, XP031092905.

(Continued)

*Primary Examiner* — Sam K Ahn
*Assistant Examiner* — James M Perez
(74) *Attorney, Agent, or Firm* — Larry Liberchuk

(57) ABSTRACT

A method (300) for performing dual carrier modulation (DCM) precoding. The method comprises generating data sub-blocks (S320), independently interleaving the sub-blocks (S330), generating bit vectors by grouping bits of the interleaved sub-blocks (S350), mapping the bit vectors into data symbols (S360), and precoding the data symbols using a precoding matrix to generate precoded symbols (S370).

9 Claims, 2 Drawing Sheets

(56) References Cited

OTHER PUBLICATIONS

Lowe D et al: "Analysis and Evaluation of MB-OFDM Dual Carrier Modulation" Proceedings of the Australian Telecommunication Networks and Applications Conference, Jun. 4-6, 2006, pp. 1-5, XP002483485.

Yuan Li et al: "Application of Iterative Detector and Decoder in Serial Concatenated Coded and Pre-Transformed Systems" IEEE International Conference on Communications, Anchorage, vol. 5, May 11-15, 2003, pp. 3105-3109, XP010643018.

Doron Rainish: "Diversity Transform for Fading Channels" IEEE Transactions on Communications, vol. 44, No. 12, Dec. 1, 1996, XPOI1008853, IEEE Service Center, Piscataway, NJ, US ISSN: 0090-6778.

* cited by examiner

DUAL CARRIER MODULATION PRECODING

This application claims the benefit from U.S. Provisional Application No. 61/046,121 filed on Apr. 18, 2008.

The invention relates generally to orthogonal frequency division multiplexing (OFDM) communication systems and, more particularly, to precoding techniques performed by such systems.

The WiMedia standard defines the specifications of a media access control (MAC) layer and a physical (PHY) layer based on orthogonal frequency division multiplexing (OFDM) transmissions. The current WiMedia standard enables short-range multimedia file transfers at rates of up to 480 Mbps with low power consumption. The standard operates in a frequency band between 3.1 GHz and 10.6 GHz in the ultra-wideband (UWB) spectrum. However, the highest data rate of the WiMedia standard rate cannot meet future wireless multimedia applications, such as high definition TV (HDTV) wireless connectivity. An effort is being made to increase the data rates to 1 Gbps and above.

To this end, weak (or non-channel) channel coding and higher order modulation techniques have been envisioned to be used in future high data rate wireless systems. For example, the WiMedia PHY transfer rate can be increased to 960 Mbps if a ¾ convolutional code together with 16QAM modulation scheme are used. However, precoding of the transmitted OFDM symbols is required to ensure good performance.

The precoding technique is needed to avoid loss of frequency diversity gain resulting from the characteristics of the OFDM transmission. Specifically, with a weak channel code, the OFDM cannot exploit the frequency diversity effectively. Therefore the channel performance is almost determined by the worst subcarrier, which has the lowest signal-to-noise-ratio (SNR). This limits the number of high data rate applications that can be carried by a conventional OFDM wireless system.

To overcome this problem, a few precoding techniques have been discussed in the related art. Generally, the precoding techniques are based on jointly modulating transmit symbols onto multiple subcarriers. This allows a receiver to recover transmit symbols even when some of these subcarriers are in deep fading. The precoding is typically performed by a precoder circuit coupled to an input of an IFFT OFDM modulator of a transmitter and by a pre-decoder circuit coupled to the output of a FFT OFDM demodulator of a receiver. Examples for precoding techniques can be found in "*OFDM or single-carrier block transmissions?*," by Z. Wang, X. Ma and G. B. Giannakis published in IEEE Transactions on Communications, vol. 52, pp. 380-394 March 2004 and in "*Linearly Precoded or Coded OFDM against Wireless Channel Fades*," by Z. Wang, and G. B. Giannakis published in Third IEEE Signal Processing Workshop on Signal Processing Advances in Wireless Communications, Taoyuan, Taiwan, Mar. 20-23, 2001.

The precoding technique adopted by the WiMedia standard community is the conventional dual carrier modulation (DCM). This precoding technique jointly precodes two symbols and transmits the precoded symbols over two different subcarriers to achieve a frequency diversity order of 2. To this end, symbols are multiplied by a precoding matrix R. For example, precoding of symbols s(i) and s(i+50) can be described as follows:

$$R = \frac{1}{\sqrt{5}}\begin{bmatrix} 2 & 1 \\ 1 & -2 \end{bmatrix}$$

$$\begin{bmatrix} x(i) \\ x(i+50) \end{bmatrix} = R * \begin{bmatrix} s(i) \\ s(i+50) \end{bmatrix} = \frac{1}{\sqrt{5}}\begin{bmatrix} 2 & 1 \\ 1 & -2 \end{bmatrix} * \begin{bmatrix} s(i) \\ s(i+50) \end{bmatrix}.$$

where, the symbols x(i) and x(i+50) are precoded symbols.

One of the drawbacks of the conventional DCM precoding is that full frequency diversity can be guaranteed only when the symbols s(i) and s(i+50) are based on quadrature phase-shift keying (QPSK) constellations. If the symbols are of higher constellations, e.g., 16 quadrature amplitude modulation (QAM), a diversity order of 2 in most cases cannot be achieved. Consequently, the DCM precoding degrades the performance of the channel.

Following is an example demonstrating the drawback of the DCM precoding technique. Two different symbol vectors $$\frac{1}{\sqrt{10}} * [3+3j, -3-3j]^T$$

and $$\frac{1}{\sqrt{10}} * [1+j, 1+j]^T$$

are precoded using the precoding matrix shown above. The precoded symbols x, and $\hat{x}$ are computed as follows:

$$x = \begin{bmatrix} x_1 \\ x_2 \end{bmatrix} = \frac{1}{\sqrt{50}}\begin{bmatrix} 2 & 1 \\ 1 & -2 \end{bmatrix}\begin{bmatrix} 3+3j \\ -3-3j \end{bmatrix} = \frac{1}{\sqrt{50}}\begin{bmatrix} 3+3j \\ 9+9j \end{bmatrix}$$

$$\hat{x} = \begin{bmatrix} \hat{x}_1 \\ \hat{x}_2 \end{bmatrix} = \frac{1}{\sqrt{50}}\begin{bmatrix} 2 & 1 \\ 1 & -2 \end{bmatrix}\begin{bmatrix} 1+j \\ 1+j \end{bmatrix} = \frac{1}{\sqrt{50}}\begin{bmatrix} 3+3j \\ -1-j \end{bmatrix}$$

As can be noticed, the first elements of $x_1$ and $\hat{x}_1$ are the same. Thus, diversity of order 2 is not achieved.

Certain embodiments of the invention include a method for performing dual carrier modulation (DCM) precoding. The method comprises generating data subblocks; independently interleaving subblocks; generating bit vectors by grouping bits of the interleaved subblocks; mapping bit vectors into data symbols; and precoding the data symbols using a unitary precoding matrix to generate precoded symbols.

Certain embodiments of the invention further include a computer readable medium having stored thereon a computer executable code causing a computer to execute the process of performing dual carrier modulation (DCM) precoding. The process comprises generating data subblocks; independently interleaving subblocks; generating bit vectors by grouping bits of the interleaved subblocks; mapping bit vectors into data symbols; and precoding the data symbols using a unitary precoding matrix to generate precoded symbols.

Certain embodiments of the invention also include an orthogonal frequency division multiplexing (OFDM) transmitter for performing a dual carrier modulation (DCM) precoding. The OFDM transmitter comprises a bit interleaver for interleaving subblocks including encoded input information bits; a constellation mapping unit for generating bit vectors from the interleaved subblocks and mapping the bit vectors to information symbols, wherein the constellation mapping unit is further capable of precoding the information symbols using a unitary precoding matrix to generate precoding symbols;

and a symbol interleaver for distributing the precoded symbols into different data subcarriers of a plurality of OFDM symbols.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
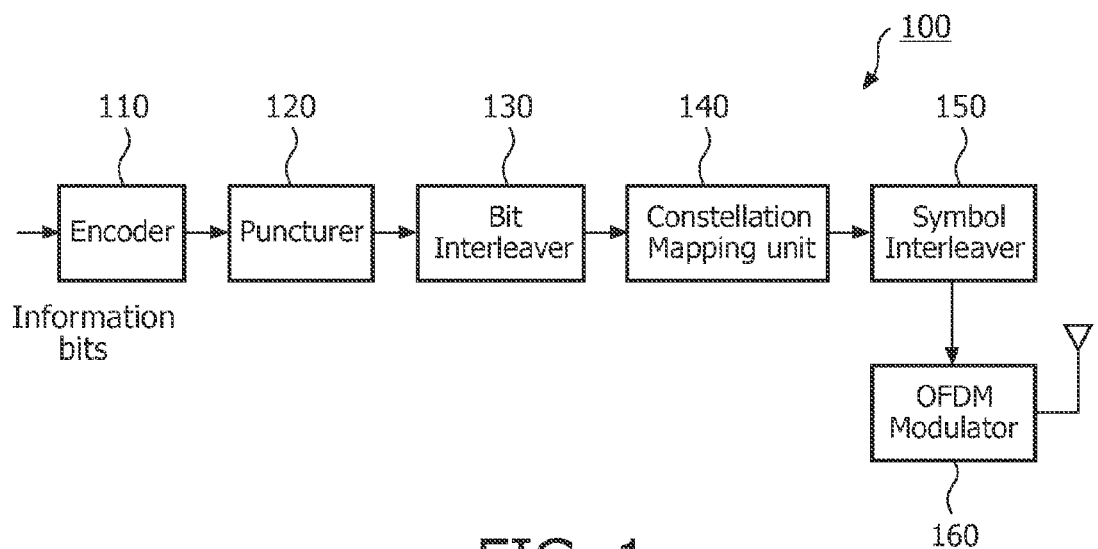
FIG. 1 is a block diagram of a transmitter adapted to perform the precoding technique realized in accordance with an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting and exemplary block diagram of an OFDM based transmitter 100 adapted to implement an improved DCM precoding technique realized in accordance with an embodiment of the invention. The transmitter 100 can transmit data at a rate of 960 Mbps and above while ensuring a frequency diversity of at least order of 2.

The transmitter 100 includes an encoder 110, a puncturer 120, a bit interleaver 130, a constellation mapping unit 140, a symbol interleaver 150, and an OFDM modulator 160. In accordance with the principles of the invention, input information bits are encoded by the encoder 110. Then, using the puncturer 120, the encoded bits are punctured and divided into data blocks, each data block including 'm' bits. Each data block is further divided into 'p' (where 'p' is an integer equal to greater than 2) sub-blocks, each including m/p bits.

Each sub-block is independently interleaved by the bit interleaver 130. The interleaver 130 may be a legacy interleaver currently being utilized in WiMedia systems. As such, the interleaver 130 supports data rates of up to 480 Mbps, new values for the interleaving parameters (e.g., NTDS, NCBP6S, NCBPS, NTint, Ncyc) for higher data rates are defined. Exemplary interleaving parameters values utilized in accordance with an embodiment of the invention are provided in Table 1.

TABLE 1

| Data Rate (Mbps) | NTDS | NCBP6S | NCBPS | NTint | Ncyc |
|---|---|---|---|---|---|
| 640 | 1 | 1200 | 200 | 20 | 33 |
| 800 | 1 | 1200 | 200 | 20 | 33 |
| 960 | 1 | 1200 | 200 | 20 | 33 |

The interleaved sub-blocks are partitioned into 'v' bit groups. Each bit group includes 'j' bits. The constellation mapping unit 140 combines the i-th (i=0, 1, ..., v−1) bit groups of the 'p' interleaved sub-blocks into bit-vectors, each bit-vector including a number of 'w' bits.

The bit-vectors are then mapped to 'n' symbols to be transmitted over 'n' data subcarriers. In accordance with one embodiment of the invention, a 4-bit vector is mapped using a Gray mapping scheme to a symbol including 16QAM constellations. Specifically, the mapping of 4-bit vectors into two symbols $s_{k,i}$ and $S_{k+50,i}$ can be described as follows:

$$(b[g(k)+i*200], b[g(k)+1200+i*200], b[g(k)+50+i*200], b[g(k)+1250]+i*200) \rightarrow s_{k,i}$$

$$(b[g(k)+1+i*200], b[g(k)+1201+i*200], b[g(k)+51+i*200], b[g(k)+1251++i*200]) \rightarrow s_{k+50,i}$$

where, g(k) may be a bit index function defined, for example, in the WiMedia Multiband OFDM Physical Layer Specification Release 1.1, July 2005.

The 16QAM symbols ($S_{k,i}$ and $S_{k+50,i}$) are further precoded, using the constellation mapping unit 140, to generate precoded symbols ($X_{k,i}$ and $X_{k+50,i}$). The precoding is performed using a precoding matrix R and can be represented as follows:

$$\begin{bmatrix} x_{k,i} \\ x_{k+50,i} \end{bmatrix} = R * \begin{bmatrix} s_{k,i} \\ s_{k+50,i} \end{bmatrix}$$

In accordance with the principles of the invention, the precoding matrix R may be defined as follows:

$$R = rnf * \begin{bmatrix} a & b \\ c & d \end{bmatrix}$$

The precoding matrix R is a unitary matrix that includes only integer elements (i.e., a, b, c, d are integers) with a real normalization factor 'rnf'. It is appreciated that the properties of the precoding matrix R, as defined herein, ensure a simple implementation of a precoding process (due to the integer values), while maintaining the power spectrum density (PSD) characteristics of a transmitted signal.

This is a very important feature in UWB systems, as such systems require very strict PSD requirements. In addition, as the precoding matrix is a real matrix, the I and Q components of a received signal can be separately decoded. Thus, the complexity of the decoding process executed by the receiver can be greatly reduced.

The following exemplary precoding matrixes are constructed in accordance with certain embodiments of the invention. These matrixes are highly efficient when 16QAM modulation or other higher-order modulation schemes are utilized.

$$R_1 = \frac{1}{\sqrt{29}} \begin{bmatrix} 5 & 2 \\ 2 & -5 \end{bmatrix}$$

$$R_2 = \frac{1}{\sqrt{34}} \begin{bmatrix} 5 & 3 \\ 3 & -5 \end{bmatrix}$$

$$R_3 = \frac{1}{\sqrt{58}} \begin{bmatrix} 7 & 3 \\ 3 & -7 \end{bmatrix}$$

$$R_4 = \frac{1}{\sqrt{73}} \begin{bmatrix} 8 & 3 \\ 3 & -8 \end{bmatrix}$$

$$R_5 = \frac{1}{\sqrt{305}} \begin{bmatrix} 16 & 7 \\ 7 & -16 \end{bmatrix}$$

$$R_6 = \frac{1}{\sqrt{65}} \begin{bmatrix} 7 & 4 \\ 4 & -7 \end{bmatrix}$$

-continued $$R_7 = \frac{1}{\sqrt{337}} \begin{bmatrix} 16 & 9 \\ 9 & -16 \end{bmatrix}$$

The symbol interleaver 150 distributes the precoded symbols (x) into different data subcarriers of different OFDM symbols. For example, the precoded symbols $X_{k,i}$ and $X_{k+50,i}$ are transmitted on the k-th and (k+50)-th data subcarriers of the i-th OFDM symbol. The OFDM modulator 160 performs an IFFT operation to generate a time-domain transmit signals, which are transmitted through an antenna.

It should be noted that the transmitter 100 is capable of operating according to wireless communication standards including, but not limited to, WiMedia UWB versions 1.0, 1.5 and 2.0, IEEE 802.11n, WiMax, and so on.

In accordance with one embodiment of the invention, the transmitter 100 implements a 16QAM modulation scheme. In this embodiment a number of 2400 precoded bits included in a 6-OFDM block are transmitted at a rate of 960 Mbps. Accordingly, each data block includes 2400 bits (i.e., m=2400), the number of sub-blocks is 2 (i.e., p=2) and the number of bits in each sub-block is 1200 (i.e., m/p=1200). Furthermore, each sub-block includes 6 bit groups (i.e., v=6) having 200 bits (i.e., j=200). The constellation mapping unit 140 combines the i-th (i=0, 1, . . . , 5) bit groups of two (i.e. p=2) consecutive interleaved sub-blocks into 50 bit-vectors, each including a number of 8 (i.e. w=8) bits. The k-th bit vector of the i-th bit group is mapped to 2 (i.e. n=2) symbols $s_{k,i}$ and $s_{k+50,i}$, which are precoded to generate symbols $X_{k,i}$ and $X_{k+50,i}$ which are transmitted over the k-th and (k+50)-th subcarriers of the i-th OFDM symbol.

Figure 2:
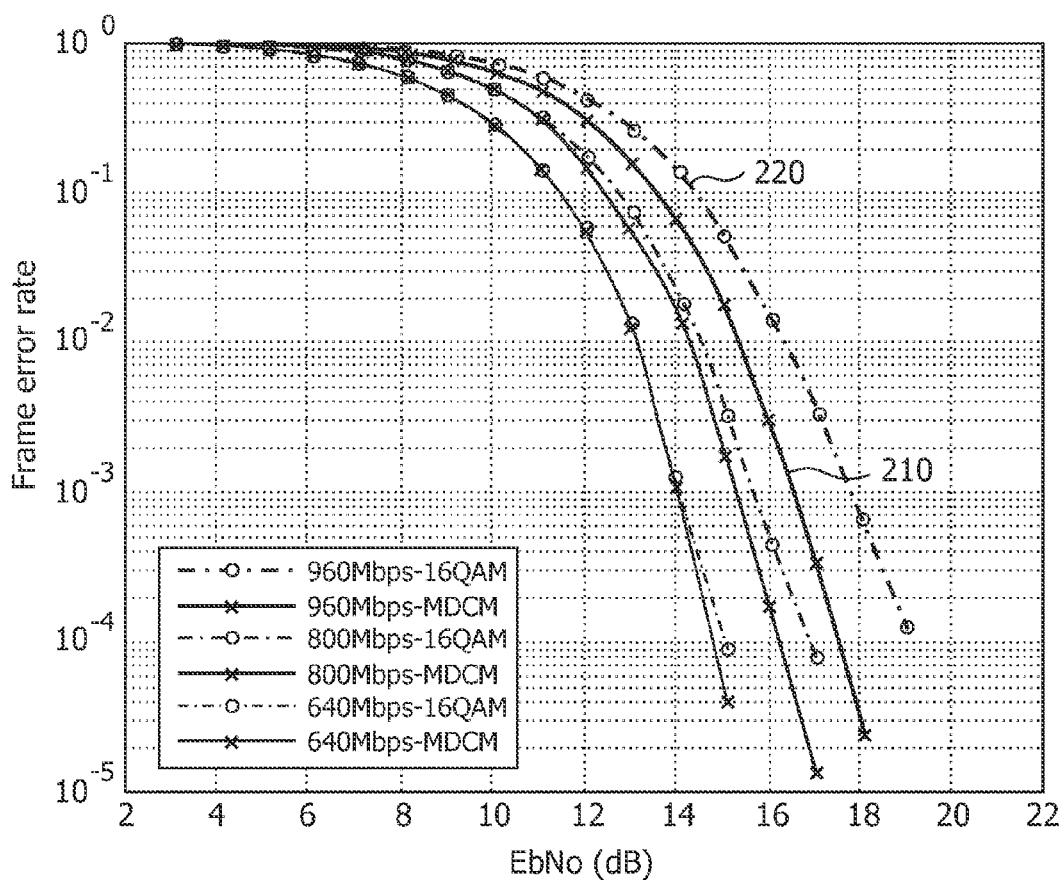
FIG. 2 is a graph showing simulation results of the precoding technique realized in accordance with the invention.

FIG. 2 shows simulation results demonstrating the performance of the precoding technique implemented in accordance with one embodiment of the invention. In the simulations, 8192 data bits are precoded. The precoding (labelled as "MDCM") is performed using the unitary precoding matrix $$R_2 = \frac{1}{\sqrt{34}} \begin{bmatrix} 5 & 3 \\ 3 & -5 \end{bmatrix}$$

having the properties described above. As can be noticed, in the high data rate (960 Mbps) the gain, indicated by a curve 210 of the MDCM precoding, is better than the gain achieved when 16QAM modulation is used, as indicated by a curve 220. That is, in order to achieve a certain level for a frame error rate, the transmission power of the 16QAM modulated signal should be higher than the transmission power of the precoded signal.

Figure 3:
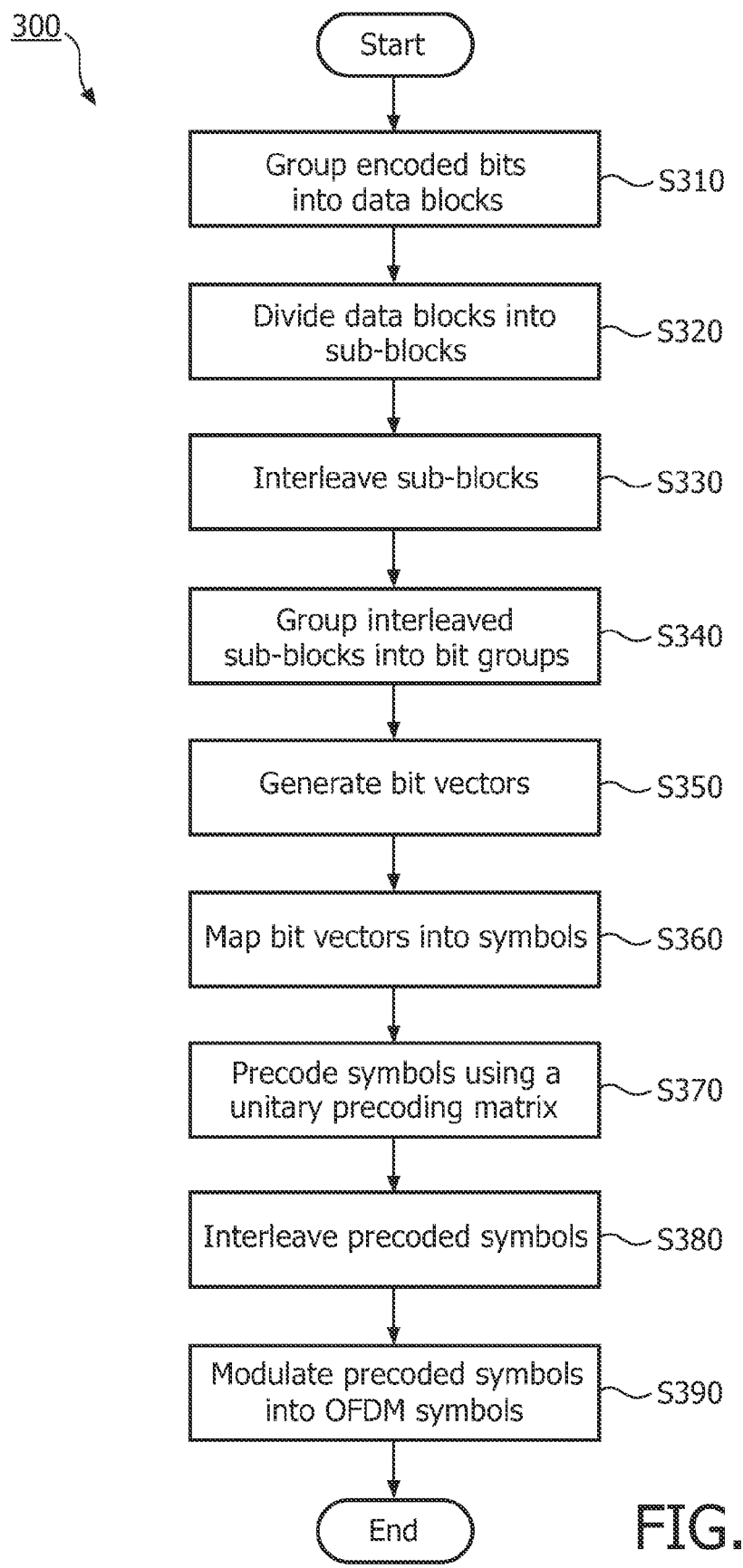
FIG. 3 is a flowchart describing an exemplary method for performing an improved DCM precoding implemented in accordance with an embodiment of the invention.

FIG. 3 shows a non-limiting flowchart 300 describing the method for performing an improved DCM precoding implemented in accordance with an embodiment of the invention. At S310 encoded information bits are grouped into data blocks, each of which includes a number of 'm' bits. The parameter 'm' is a function of the data rate and the modulation scheme being used. At S320 data blocks are divided into a number of 'p' sub-blocks, each sub-block including a number of 'm/p' bits. At S330 each sub-block is interleaved, and at S340 the bits of each interleaved sub-block are grouped into 'v' bit groups. At S350 the respective i-th bit groups of the interleaved sub-blocks are combined to generate bit vectors. At S360 each bit vector is mapped into a symbol. The bit vector to symbol mapping can be any one-to-one mapping scheme, including but not limited to, a Gray mapping, a set-partitioning mapping, and the like. In a preferred embodiment, the mapping is performed using a Gray mapping.

At S370 the symbols are precoded using a unitary precoding matrix having the properties described in detail above. Specifically, to achieve a frequency diversity order of 2, two symbols to be transmitted on the different subcarriers of the same OFDM symbol are multiplied by the unitary precoding matrix. At S380 the precoded symbols are interleaved, as mentioned above. Thereafter, at S390 all the precoded symbols are modulated into the different subcarriers and OFDM symbols and transmitted over a wireless medium.

It is appreciated that the improved DCM precoding described herein allows increasing the data rates of transmission with better gain performance while reducing the complexity of a precoder circuit and, hence, of the transmitter.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for performing dual carrier modulation (DCM) precoding using an orthogonal frequency division multiplexing (OFDM) transmitter, comprising:
   generating, by the OFDM transmitter, data sub-blocks;
   independently interleaving the sub-blocks;
   generating bit vectors by grouping bits of the interleaved sub-blocks;
   mapping the bit vectors into data symbols; and
   precoding the data symbols using a precoding matrix to generate precoded symbols, the precoding matrix being a unitary matrix and a real matrix that includes only integer elements multiplied by a real normalization factor, the precoding matrix for a 16QAM modulation scheme being selected from the group consisting of:

$$R_1 = \frac{1}{\sqrt{29}} \begin{bmatrix} 5 & 2 \\ 2 & -5 \end{bmatrix};$$

$$R_2 = \frac{1}{\sqrt{34}} \begin{bmatrix} 5 & 3 \\ 3 & -5 \end{bmatrix};$$

$$R_3 = \frac{1}{\sqrt{58}} \begin{bmatrix} 7 & 3 \\ 3 & -7 \end{bmatrix};$$

-continued $$R_4 = \frac{1}{\sqrt{73}}\begin{bmatrix} 8 & 3 \\ 3 & -8 \end{bmatrix};$$

$$R_5 = \frac{1}{\sqrt{305}}\begin{bmatrix} 16 & 7 \\ 7 & -16 \end{bmatrix};$$

$$R_6 = \frac{1}{\sqrt{65}}\begin{bmatrix} 7 & 4 \\ 4 & -7 \end{bmatrix};$$

and $$R_7 = \frac{1}{\sqrt{337}}\begin{bmatrix} 16 & 9 \\ 9 & -16 \end{bmatrix}.$$

2. The method of claim 1, further comprising:
  interleaving the precoded symbols by distributing the precoded symbols to different data subcarriers of a plurality of OFDM symbols; and
  modulating the precoded symbols into the data subcarriers of the plurality of OFDM symbols.

3. The method of claim 1, wherein generating the data sub-blocks further comprises grouping encoded input information bits into data blocks, wherein the number of bits in each data block is a function of a modulation scheme and a transfer rate; and dividing the data blocks into the plurality of sub-blocks.

4. The method of claim 3, wherein the modulation scheme is at least 16QAM.

5. The method of claim 1, wherein generating the bit vectors further comprises grouping bits of the interleaved sub-blocks into a plurality of bit groups and combining the respective bit group of the interleaved sub-blocks to generate the bit vectors.

6. The method of claim 1, wherein the mapping of the bit vectors into the data symbols is performed using at least one of a Gray mapping or a set-partitioning mapping.

7. A non-transitory computer-readable medium having stored thereon computer executable code for performing dual carrier modulation (DCM) precoding, comprising:
  generating data sub-blocks;
  independently interleaving the generated sub-blocks;
  generating bit vectors by grouping bits of the interleaved sub-blocks;
  mapping the bit vectors into data symbols; and
  precoding the data symbols using a precoding matrix to generate precoded symbols, the precoding matrix being a unitary matrix and a real matrix that includes only integer elements multiplied by a real normalization factor, the precoding matrix for a 16QAM modulation scheme being selected from the group consisting of:

$$R_1 = \frac{1}{\sqrt{29}}\begin{bmatrix} 5 & 2 \\ 2 & -5 \end{bmatrix};$$

$$R_2 = \frac{1}{\sqrt{34}}\begin{bmatrix} 5 & 3 \\ 3 & -5 \end{bmatrix};$$

$$R_3 = \frac{1}{\sqrt{58}}\begin{bmatrix} 7 & 3 \\ 3 & -7 \end{bmatrix};$$

$$R_4 = \frac{1}{\sqrt{73}}\begin{bmatrix} 8 & 3 \\ 3 & -8 \end{bmatrix};$$

$$R_5 = \frac{1}{\sqrt{305}}\begin{bmatrix} 16 & 7 \\ 7 & -16 \end{bmatrix};$$

$$R_6 = \frac{1}{\sqrt{65}}\begin{bmatrix} 7 & 4 \\ 4 & -7 \end{bmatrix};$$

and $$R_7 = \frac{1}{\sqrt{337}}\begin{bmatrix} 16 & 9 \\ 9 & -16 \end{bmatrix}.$$

8. An orthogonal frequency division multiplexing (OFDM) transmitter for performing a dual carrier modulation (DCM) precoding, comprising:
  a bit interleaver for independently interleaving sub-blocks including encoded input information bits;
  a constellation mapping unit for generating bit vectors from the interleaved sub-blocks and mapping the bit vectors to information symbols, wherein the constellation mapping unit is further capable of precoding the information symbols using a precoding matrix to generate precoded information symbols, the precoding matrix being a unitary matrix and a real matrix that includes only integer elements multiplied by a real normalization factor, the precoding matrix for a 16QAM modulation scheme being selected from the group consisting of:

$$R_1 = \frac{1}{\sqrt{29}}\begin{bmatrix} 5 & 2 \\ 2 & -5 \end{bmatrix};$$

$$R_2 = \frac{1}{\sqrt{34}}\begin{bmatrix} 5 & 3 \\ 3 & -5 \end{bmatrix};$$

$$R_3 = \frac{1}{\sqrt{58}}\begin{bmatrix} 7 & 3 \\ 3 & -7 \end{bmatrix};$$

$$R_4 = \frac{1}{\sqrt{73}}\begin{bmatrix} 8 & 3 \\ 3 & -8 \end{bmatrix};$$

$$R_5 = \frac{1}{\sqrt{305}}\begin{bmatrix} 16 & 7 \\ 7 & -16 \end{bmatrix};$$

$$R_6 = \frac{1}{\sqrt{65}}\begin{bmatrix} 7 & 4 \\ 4 & -7 \end{bmatrix}; \text{ and}$$

$$R_7 = \frac{1}{\sqrt{337}}\begin{bmatrix} 16 & 9 \\ 9 & -16 \end{bmatrix};$$

and
  a symbol interleaver for distributing the precoded information symbols into different data subcarriers of a plurality of OFDM symbols.

9. The OFDM transmitter of claim 8, further comprising:
  an encoder for encoding the input information bits; and
  a puncturer for generating the sub-blocks from the encoded input information bits.

* * * * *